US007921373B2

(12) United States Patent
Yamashita et al.

(10) Patent No.: US 7,921,373 B2
(45) Date of Patent: Apr. 5, 2011

(54) DISPLAY SCREEN MANAGEMENT APPARATUS

(75) Inventors: Ken Yamashita, Nara (JP); Hidehiko Shin, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/582,386

(22) PCT Filed: Mar. 29, 2005

(86) PCT No.: PCT/JP2005/005869

§ 371 (c)(1), (2), (4) Date: Jun. 9, 2006

(87) PCT Pub. No.: WO2005/098588

PCT Pub. Date: Oct. 20, 2005

(65) Prior Publication Data

US 2007/0180395 A1 Aug. 2, 2007

(30) Foreign Application Priority Data

Apr. 5, 2004 (JP) ................................ 2004-110780

(51) Int. Cl.
*G06F 3/048* (2006.01)

(52) U.S. Cl. ........................................ 715/778; 715/802

(58) Field of Classification Search .................. 715/778, 715/802; 345/545–548

See application file for complete search history.

(56) References Cited

U.S. PATENT DOCUMENTS 4,484,302 A * 11/1984 Cason et al. .................. 715/802
4,870,397 A * 9/1989 Soto et al. ..................... 715/778
5,245,702 A * 9/1993 McIntyre et al. ............. 345/541
5,289,574 A * 2/1994 Sawyer ......................... 715/759
5,386,505 A * 1/1995 Beattie et al. ................ 715/790
5,515,494 A * 5/1996 Lentz ............................ 715/797
5,561,755 A * 10/1996 Bradley ........................ 715/806
5,564,002 A * 10/1996 Brown .......................... 715/778

(Continued)

FOREIGN PATENT DOCUMENTS

JP 9-97158 4/1997

(Continued)

OTHER PUBLICATIONS

Cache Replacement Algorithms, The International Series in Engineering and Computer Science, 2004, Springer Netherlands, vol. 772, pp. 61-72.*

*Primary Examiner* — William L Bashore
*Assistant Examiner* — Ashraf Zahr
(74) *Attorney, Agent, or Firm* — Wenderoth, Lind & Ponack, L.L.P.

(57) ABSTRACT

A display screen management unit is provided which can reduce a screen resource required to switch screens and simultaneously display a pre-transition screen and a post-transition screen. A screen control section requests a screen discard determination section to determine whether or not a currently displayed screen is to be discarded. The screen discard determination section compares currently displayed screen information with switching target screen information, and when the currently displayed screen is completely hidden by the switching target screen, determines that the currently displayed screen is to be discarded. The screen control section discards a screen resource for the screen determined to be discarded, from a screen resource saving section. The screen control section generates a screen resource for the switching target screen, and saves the screen resource into the screen resource saving section. The screen control section causes a display section to display the saved screen resource.

4 Claims, 13 Drawing Sheets

U.S. PATENT DOCUMENTS

| | | | | |
|---|---|---|---|---|
| 5,764,214 | A * | 6/1998 | Takano | 345/619 |
| 5,877,762 | A * | 3/1999 | Young | 715/803 |
| 5,900,859 | A * | 5/1999 | Takishita et al. | 345/629 |
| 5,959,639 | A * | 9/1999 | Wada | 345/542 |
| 6,133,898 | A * | 10/2000 | Ludolph et al. | 715/790 |
| 6,326,969 | B1 * | 12/2001 | Helman et al. | 345/629 |
| 6,573,915 | B1 * | 6/2003 | Sivan et al. | 715/781 |
| 6,593,945 | B1 * | 7/2003 | Nason et al. | 715/779 |
| 6,630,943 | B1 * | 10/2003 | Nason et al. | 715/746 |
| 6,639,613 | B1 * | 10/2003 | Nason et al. | 715/778 |
| 6,686,936 | B1 * | 2/2004 | Nason et al. | 715/778 |
| 6,710,790 | B1 * | 3/2004 | Fagioli | 715/802 |
| 6,727,918 | B1 * | 4/2004 | Nason | 715/791 |
| 6,828,991 | B2 * | 12/2004 | Nason et al. | 715/778 |
| 6,831,666 | B1 * | 12/2004 | Kreis | 715/781 |
| 6,892,359 | B1 * | 5/2005 | Nason et al. | 715/788 |
| 6,917,362 | B2 * | 7/2005 | Pinedo et al. | 345/530 |
| 6,966,036 | B2 * | 11/2005 | Nason et al. | 715/778 |
| 7,010,755 | B2 * | 3/2006 | Anderson et al. | 715/778 |
| 7,012,612 | B1 * | 3/2006 | O'Neill et al. | 345/557 |
| 7,043,697 | B1 * | 5/2006 | Jensen et al. | 715/788 |
| 7,103,850 | B1 * | 9/2006 | Engstrom et al. | 715/778 |
| 7,190,883 | B2 * | 3/2007 | Yeo | 386/109 |
| 2002/0037753 | A1 * | 3/2002 | Shitahaku | 455/566 |
| 2003/0189597 | A1 * | 10/2003 | Anderson et al. | 345/778 |
| 2007/0180396 | A1 * | 8/2007 | Yajima et al. | 715/778 |

FOREIGN PATENT DOCUMENTS

| | | |
|---|---|---|
| JP | 2002-111805 | 4/2002 |

* cited by examiner

101

| SCREEN ATTRIBUTE | | | SCREEN GENERATING PROCESS | SCREEN DISCARDING PROCESS |
|---|---|---|---|---|
| SIZE | X COORDINATE | Y COORDINATE | | |
| 180×100 | 20 | 20 | func_a | func_A |
| 50×25 | 80 | 80 | func_b | func_B |
| 320×240 | 0 | 0 | func_c | func_C |
| 20×20 | 15 | 0 | func_d | func_D |

F I G. 3

104

| SCREEN ATTRIBUTE | | | SCREEN GENERATING PROCESS | SCREEN DISCARDING PROCESS | |
|---|---|---|---|---|---|
| SIZE | X COORDINATE | Y COORDINATE | | | |
| 180×100 | 20 | 20 | func_a | func_A | 104a |
| 50×25 | 80 | 80 | func_b | func_B | 104b |
| | | | | | |

F I G. 1 0

104

| SCREEN ATTRIBUTE | | | | SCREEN GENERATING PROCESS | SCREEN DISCARDING PROCESS | |
|---|---|---|---|---|---|---|
| SIZE | X COORDINATE | Y COORDINATE | RESIDENCE INFORMATION | | | |
| 180 × 100 | 20 | 20 | RESIDENT | func_a | func_A | 104a |
| 50 × 25 | 80 | 80 | NON-RESIDENT | func_b | func_B | 104b |

F I G. 1 1

104

| SCREEN ATTRIBUTE | | | | SCREEN GENERATING PROCESS | SCREEN DISCARDING PROCESS | |
|---|---|---|---|---|---|---|
| SIZE | X COORDINATE | Y COORDINATE | DISPLAY TIME | | | |
| 180 × 100 | 20 | 20 | -- | func_a | func_A | 104a |
| 50 × 25 | 80 | 80 | 1sec | func_b | func_B | 104b |

201

| SCREEN IDENTIFIER | SCREEN ATTRIBUTE | | | SCREEN GENERATING PROCESS | SCREEN DISCARDING PROCESS |
|---|---|---|---|---|---|
| | SIZE | X COORDINATE | Y COORDINATE | | |
| SCREEN A | 180×100 | 20 | 20 | func_a | func_A |
| SCREEN B | 50×25 | 80 | 80 | func_b | func_B |
| SCREEN C | 320×240 | 0 | 0 | func_c | func_C |
| SCREEN D | 20×20 | 15 | 0 | func_d | func_D |

FIG. 15

204

| SCREEN IDENTIFIER | SCREEN STATUS | SCREEN ATTRIBUTE | | | SCREEN GENERATING PROCESS | SCREEN DISCARDING PROCESS |
|---|---|---|---|---|---|---|
| | | SIZE | X COORDINATE | Y COORDINATE | | |
| SCREEN A | CURRENTLY DISPLAYED 1 | 180×100 | 20 | 20 | func_a | func_A |
| SCREEN B | CURRENTLY DISPLAYED 2 | 50×25 | 80 | 80 | func_b | func_B |
| SCREEN C | NOT CURRENTLY DISPLAYED | 320×240 | 0 | 0 | func_c | func_C |
| SCREEN D | NOT YET GENERATED | 20×20 | 15 | 0 | func_d | func_D |

| CURRENTLY DISPLAYED SCREEN | TRANSITION DESTINATION SCREEN |
|---|---|
| SCREEN A | SCREEN B、SCREEN C |
| SCREEN B | SCREEN C |
| SCREEN C | SCREEN A、SCREEN D、SCREEN E |

DISPLAY SCREEN MANAGEMENT APPARATUS

BACKGROUND OF THE INVENTION

1. Field of the Invention

The present invention relates to a display screen management unit which switches and displays a plurality of screens. More particularly, the present invention relates to a display screen management unit which can reduce a screen resource required to switch screens and simultaneously display a screen before transition and a screen after transition.

2. Description of the Related Art

The term "screen" refers to information itself which is displayed on a display, but not to a display part (display), such as an LCD, liquid crystal, or the like. In other words, the screen is a unit which indicates a set of window instances which interact with a user. The term "screen resource" refers to a resource required to display a specific screen on a display. The screen resource is generated by a screen generating process and is discarded by a screen discarding process.

There is, for example, a conventional display screen management unit for switching and displaying a plurality of screens, that generates screen resources for all possible screens which can be displayed by a system when the system is started up. Such a display screen management unit switches and displays a plurality of screens in sequence by selecting screen resources to be switched from all screen resources which are generated when the system is started up.

However, since such a display screen management unit generates all screen resources when the system is started up, there are problems, such as a long time required to start up the system, a large size of memory required to store the generated screen resources, and the like. Therefore, the conventional display screen management unit needs to have a memory (e.g., a RAM or a flash memory) which can store the generated screen resources, or needs to store screen resources which cannot be stored in a memory into an external storage device, such as a hard disk or the like. If a screen resource is stored in a hard disk, swapping occurs with high frequency between the memory and the hard disk when screens are switched, so that screen switching is disadvantageously slowed, or the like.

In order to solve such a problem, Japanese Patent Laid-Open Publication No. 9-97158 discloses a display screen management unit which reduces a screen resource required to switch screens to effectively use a memory area. The conventional display screen management unit uses a screen flow diagram (see FIG. 19) in which currently displayed screens are associated with all possible screens which can become transition destinations (hereinafter referred to as all transition screens), to previously generate screen resources of all transition screens. When a screen is transitioned, a screen resource which is actually transitioned is selected from screen resources for all transition screens and is displayed, and screen resources which are not selected are discarded. Thereby, the conventional display screen management unit reduces a screen resource required to switch screens to effectively use a memory area, and prevents occurrence of swapping or the like to shorten a response time when switching screens.

PROBLEMS TO BE SOLVED BY THE INVENTION

However, the conventional display screen management unit also discards a screen resource displayed before transition as a screen resource which is not selected as a transition destination (switching target). Therefore, the conventional display screen management unit cannot display a screen before transition (pre-transition screen) in the background of a screen after transition (post-transition screen), a display area of a display in which a post-transition screen is not displayed, or the like. In other words, the conventional display screen management unit cannot simultaneously display a pre-transition screen and a post-transition screen (i.e., a switching target screen).

Therefore, an object of the present invention is to provide a display screen management unit which can reduce a screen resource required to switch screens, and can simultaneously display a pre-transition screen and a post-transition screen.

SUMMARY OF THE INVENTION

The present invention is directed to a display screen management unit of switching and displaying a plurality of screens on a display by screen transition. To achieve the above-described object, the display screen management unit of the present invention comprises a saving section for saving screen information about the plurality of screens, an instruction section for providing an instruction to switch a currently displayed screen in response to an external request, a screen control section for controlling a display on the display in accordance with the instruction from the instruction section, and a screen discard determination section for comparing the currently displayed screen with a switching target screen indicated by the instruction section based on the screen information saved in the saving section, to determine whether or not the currently displayed screen is discarded. When the screen discard determination section determines that the currently displayed screen is to be discarded, the screen control section discards information about the currently displayed screen from the saving section.

The saving section can include a screen resource saving section of saving a screen resource for a screen to be displayed on the display. Preferably, when instructed to switch screens from the instruction section, the screen control section generates a screen resource for the switching target screen, and saves the generated screen resource into the screen resource saving section, and requests the screen discard determination section to determine whether or not the currently displayed screen is to be discarded.

The saving section can include an initial screen information saving section of saving initial screen information which prescribes initial screen information, and a screen information saving section of saving the currently displayed screen information and the switching target screen information. Preferably, when providing an instruction to switch the currently displayed screen, the instruction section reads out initial screen information about the switching target screen from the initial screen information saving section, and notifies the screen control section of the read initial screen information. The screen control section saves the notified initial screen information as the switching target screen information into the screen information saving section.

When the screen discard determination section determines that the currently displayed screen is to be discarded, the screen control section may discard a screen resource for the screen determined to be discarded, from the screen resource saving section. When the screen discard determination section determines that the currently displayed screen is to be discarded, the screen control section may discard screen information about the screen determined to be discarded, from the screen information saving section.

Preferably, when the whole or a part of the currently displayed screen is displayed simultaneously with the switching target screen, the screen discard determination section determines that the currently displayed screen is not to be discarded, and when the currently displayed screen is completely hidden by the switching target screen, the screen discard determination section determines that the currently displayed screen is to be discarded.

The screen information includes information indicating a screen size. In this case, the screen discard determination section can use the screen size indicating information included in the screen information to determine whether or not the currently displayed screen is to be discarded.

The screen information includes information indicating a screen position. In this case, the screen discard determination section can use the screen position indicating information included in the screen information to determine whether or not the currently displayed screen is to be discarded.

The screen information includes residence information indicating whether a screen is resident or non-resident. In this case, when it is determined based on the residence information included in the screen information that the currently displayed screen is resident, the screen discard determination section may determine that the currently displayed screen is not to be discarded.

The screen information includes a display time from when a screen is displayed to when the screen goes to a non-displayed state. In this case, when it is determined based on the display time that the switching target screen display time is shorter than a predetermined time, the screen discard determination section may determine that the currently displayed screen is not to be discarded.

The screen information includes mask information about a screen. In this case, the screen discard determination section can use the mask information included in the screen information to determine whether or not the currently displayed screen is discarded.

The display screen management unit may further comprise a registration section of registering initial screen information saved in the initial screen information saving section via the screen control section into the screen information saving section. In this case, the registration section notifies the screen control section of all initial screen information saved in the initial screen information saving section. The screen control section saves the initial screen information notified of by the registration section as the screen information into the screen information saving section.

The display screen management unit may further comprise a communications section of obtaining application data including screen information via an external network, and a screen information extraction section of extracting the screen information from the application data obtained by the communications section. The registration section notifies the screen control section of the screen information extracted by the screen information extraction section. The screen control section saves the notified screen information into the screen information saving section.

The present invention is also directed to a display screen management method of switching and displaying a plurality of screens on a display by screen transition. The display screen management method comprises the steps of providing an instruction to switch a currently displayed screen in response to an external request, controlling a display on the display in accordance with the instruction from the instruction step, determining whether or not the currently displayed screen is to be discarded, by comparing the currently displayed screen with the indicated switching target screen based on previously saved screen information, and discarding information about the currently displayed screen when the determining step determines that the currently displayed screen is to be discarded.

In the step of discarding the information about the currently displayed screen, a screen resource for a screen determined in the determining step to be discarded, is discarded.

In the step of determining whether or not the currently displayed screen is to be discarded, when the whole or a part of the currently displayed screen is displayed simultaneously with the switching target screen, it is determined that the currently displayed screen is not to be discarded, and when the currently displayed screen is completely hidden by the switching target screen, it is determined that the currently displayed screen is to be discarded.

The present invention is also directed to a program which is executed by a display screen management device of switching and displaying a plurality of screens on a display by screen transition. The program of the present invention causes the device to execute the steps of providing an instruction to switch a currently displayed screen in response to an external request, controlling a display on the display in accordance with the instruction from the instruction step, determining whether or not the currently displayed screen is to be discarded, by comparing the currently displayed screen with the indicated switching target screen based on previously saved screen information, and discarding information about the currently displayed screen when the determining step determines that the currently displayed screen is to be discarded.

EFFECT OF THE INVENTION

According to the display screen management unit of the present invention, when a screen is transitioned, the display screen management unit compares the screen attributes of a currently displayed screen with the screen attributes of a switching target screen, and only when the currently displayed screen is completely covered with the switching target screen, discards a screen resource for the currently displayed screen. Thereby, the display screen management unit can reduce a screen resource required to switch screens and simultaneously display a pre-transition screen and a post-transition screen.

In addition, the display screen management unit previously saves screen information about all screens into the screen information saving section, thereby making it possible to reduce overhead for saving the screen information into the screen information saving section when a screen switching request is issued. In addition, the screen status can be set to be "not currently displayed", so that the screen resource for a resident screen can continue to be saved. Thereby, the display screen management unit can improve the screen display speed when screens are switched.

In addition, the display screen management unit further comprises the communications section and the screen information extraction section, thereby making it possible to register screen information included in application data received via a network into the screen information saving section. Thereby, the display screen management unit can also use a screen other than those previously saved in the initial screen information saving section, as a switching target screen.

BRIEF DESCRIPTION OF THE DRAWINGS

FIG. 3 is a diagram illustrating exemplary screen information saved in a screen information saving section.

FIG. 10 is another diagram illustrating exemplary screen information including residence information as a screen attribute.

FIG. 11 is a diagram illustrating exemplary screen information including a display time as a screen attribute.

FIG. 15 is a diagram illustrating exemplary screen information saved in a screen information saving section.

DETAILED DESCRIPTION OF THE INVENTION

Hereinafter, embodiments of the present invention will be described with reference to the accompanying drawings.

First Embodiment

Figures 1, 2:
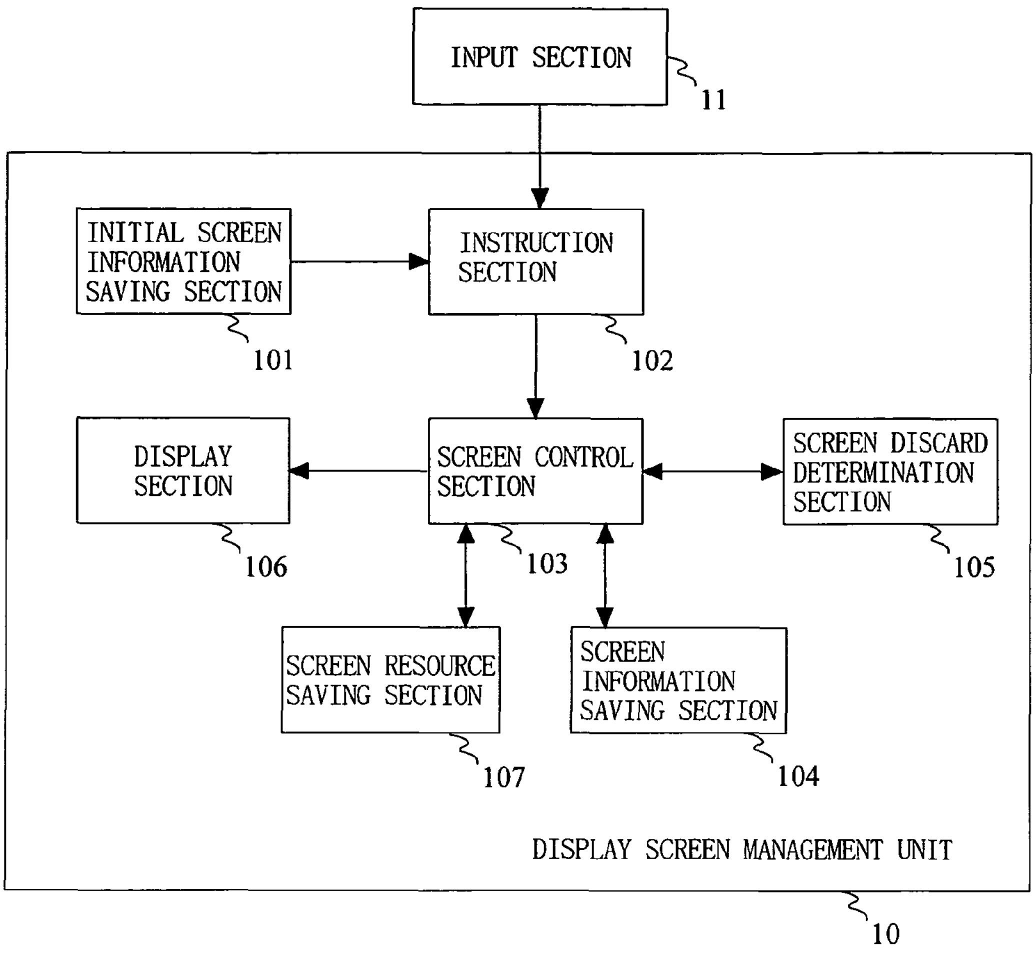
FIG. 1 is a block diagram illustrating an exemplary configuration of a display screen management unit according to a first embodiment of the present invention.
FIG. 2 is a diagram illustrating exemplary initial screen information saved by an initial screen information saving section.

FIG. 1 is a block diagram illustrating an exemplary configuration of a display screen management unit 10 according to a first embodiment of the present invention. In FIG. 1, the display screen management unit 10 comprises an initial screen information saving section 101, an instruction section 102, a screen control section 103, a screen information saving section 104, a screen discard determination section 105, a display section 106, and a screen resource saving section 107. Note the initial screen information saving section 101, the screen information saving section 104, and the screen resource saving section 107 may be integrated into a saving section. The saving section is implemented as, for example, a memory device (e.g., a RAM, a ROM, etc.) or an external storage device (e.g., a hard disk, etc.).

The initial screen information saving section 101 is an area for saving initial screen information which prescribes initial screen information. The initial screen information saving section 101 is assumed to previously save initial screen information about all possible screens which can be displayed by the display screen management unit 10. FIG. 2 is a diagram illustrating exemplary initial screen information saved by the initial screen information saving section 101. Referring to FIG. 2, the initial screen information includes screen attributes indicating a size and a coordinate position of a screen, a process for generating a screen resource (hereinafter referred to as a screen generating process), and a process for discarding a screen resource (hereinafter referred to as a screen discarding process). Note that, for the screen size and coordinates, a previously determined unit (e.g., pixel, inch, etc.) is assumed to be used.

The instruction section 102 receives a screen switching request from an input section 11. The input section 11 is, for example, a keyboard, which is operated by the user. The input section 11 may be any application which requests screen switching. When the input section 11 is a keyboard, the instruction section 102 receives a screen switching request which is directly input by the user via the keyboard. Note that the input section 11 may be provided inside the display screen management unit 10. The instruction section 102 notifies the screen control section 103 of initial screen information about a switching target screen, and provides an instruction to switch screens. As used herein, the term "screen switching" indicates that a new switching target screen is displayed over (closer to the user than) a currently displayed screen, due to a screen transition.

The screen control section 103 controls various operations relating to screen display, such as the screen resource generating process, the screen resource discarding process, and the like. For example, when receiving an instruction to switch screens from the instruction section 102, the screen control section 103 saves switching target screen information into the screen information saving section 104, and requests the screen discard determination section 105 to determine whether or not to discard a currently displayed screen.

The screen information saving section 104 is an area for saving currently displayed screen information and switching target screen information. FIG. 3 is a diagram illustrating exemplary screen information saved in the screen information saving section 104. In FIG. 3, for example, screen information **104*a* is currently displayed screen information, and screen information 104*b* is switching target screen information. The screen information saved in the screen information saving section 104** is updated as required when the position and size of a screen are changed by a user's operation or the like.

The screen discard determination section 105 determines whether or not a currently displayed screen is to be discarded. For example, when a currently displayed screen is completely hidden behind a switching target screen, the screen discard determination section 105 determines that the currently displayed screen is to be discarded. On the other hand, when the whole or a part of a currently displayed screen is displayed behind a switching target screen, the screen discard determination section 105 determines that the currently displayed screen is not to be discarded.

The display section 106 is a display for displaying a screen to be displayed which is requested by the screen control section 103. Note that the display section 106 may be provided outside the display screen management unit 10. The screen resource saving section 107 is an area for saving one or more screen resources. In the screen resource saving section

107, a screen resource generated in the screen generating process by the screen control section 103 is saved. The screen resource saved in the screen resource saving section 107 is discarded by the screen control section 103 executing the screen discarding process.

Figure 4:
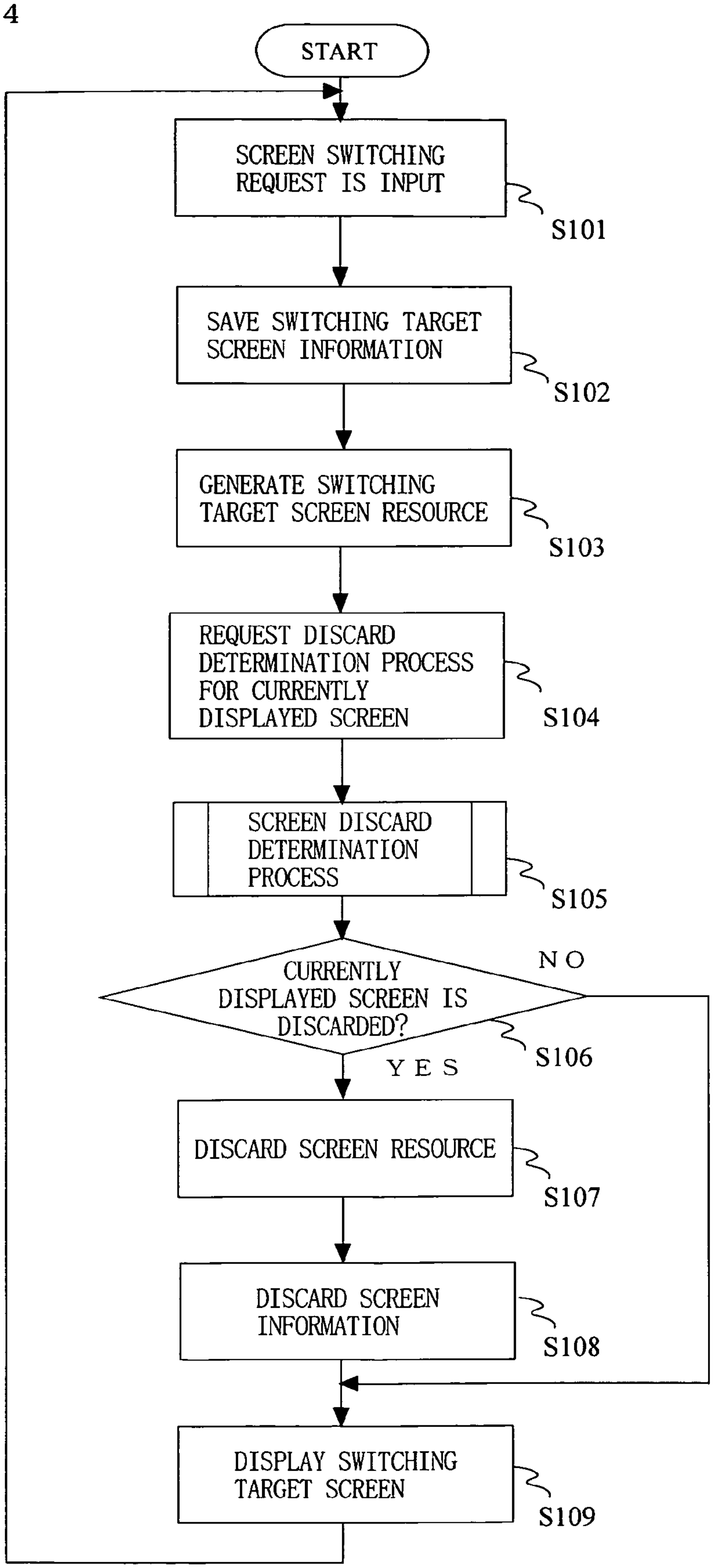
FIG. 4 is a flowchart illustrating an exemplary operation of the display screen management unit of the first embodiment of the present invention.

FIG. 4 is a flowchart illustrating an exemplary operation of the display screen management unit 10 of the first embodiment of the present invention. Referring to FIG. 4, the instruction section 102 receives a screen switching request from the input section 11 (step S101). When receiving the screen switching request, the instruction section 102 reads out initial screen information about a switching target from the initial screen information saving section 101, and notifies the screen control section 103 of the read initial screen information.

The screen control section 103 saves the initial screen information which is notified by the instruction section 102, as switching target screen information, into the screen information saving section 104 (step S102). Next, the screen control section 103 executes the screen generating process based on the screen information saved in the screen information saving section 104 to generate a switching target screen resource (step S103). Here, the generated screen resource is saved into the screen resource saving section 107.

The screen control section 103 extracts currently displayed screen attributes and switching target screen attributes from the screen information saved in the screen information saving section 104. Thereafter, the screen discard determination section 105 is notified of the extracted screen attributes, and is requested for determination of whether or not the currently displayed screen is to be discarded (step S104). When there are two or more currently displayed screens, the screen control section 103 notifies the screen discard determination section 105 of the screen attributes of all the currently displayed screens and the screen attributes of switching targets. The screen control section 103 may notify the screen discard determination section 105 of a plurality of screen attributes simultaneously or per pair of one currently displayed screen attribute and one switching target screen attribute (repeated a number of times corresponding to the number of pairs of the screen attributes).

The screen discard determination section 105 compares a currently displayed screen attribute with a switching target screen attribute, depending on the request from the screen control section 103, to perform a screen discard determination process (step S105). The screen control section 103 is notified of the result of the determination. Note that details of the discard determination process will be described below by way of a specific example.

When it is determined that a currently displayed screen is to be discarded, the screen control section 103 performs the screen discarding process with respect to a screen which is determined to be discarded. Thereby, the screen control section 103 discards a screen resource saved in the screen resource saving section 107 (steps S106, S107). In addition, screen information about the screen which is determined to be discarded is discarded from the screen information saving section 104 (step S108). When it is determined that a plurality of screens are to be discarded, the screen control section 103 executes the screen discarding process with respect to all the screens. On the other hand, when it is determined that a currently displayed screen is not to be discarded, the screen control section 103 does not perform the screen discarding process (step S106).

Next, the screen control section 103 uses a screen resource saved in the screen resource saving section 107 to cause the display section 106 to display a switching target screen (step S109). When there are a plurality of generated screen resources, the screen control section 103 notifies the display section 106 of the order of display of screens.

Note that, after the screen control section 103 saves the switching target screen information into the screen information saving section 104 and until the switching target screen is displayed on the display section 106 (i.e., a period from step S102 to step S109), the screen resource generating process (i.e., step S103) may be performed with any timing. For example, the screen control section 103 may perform the screen resource generating process after the screen discard determination process is performed (steps S105, S106).

Figure 12:
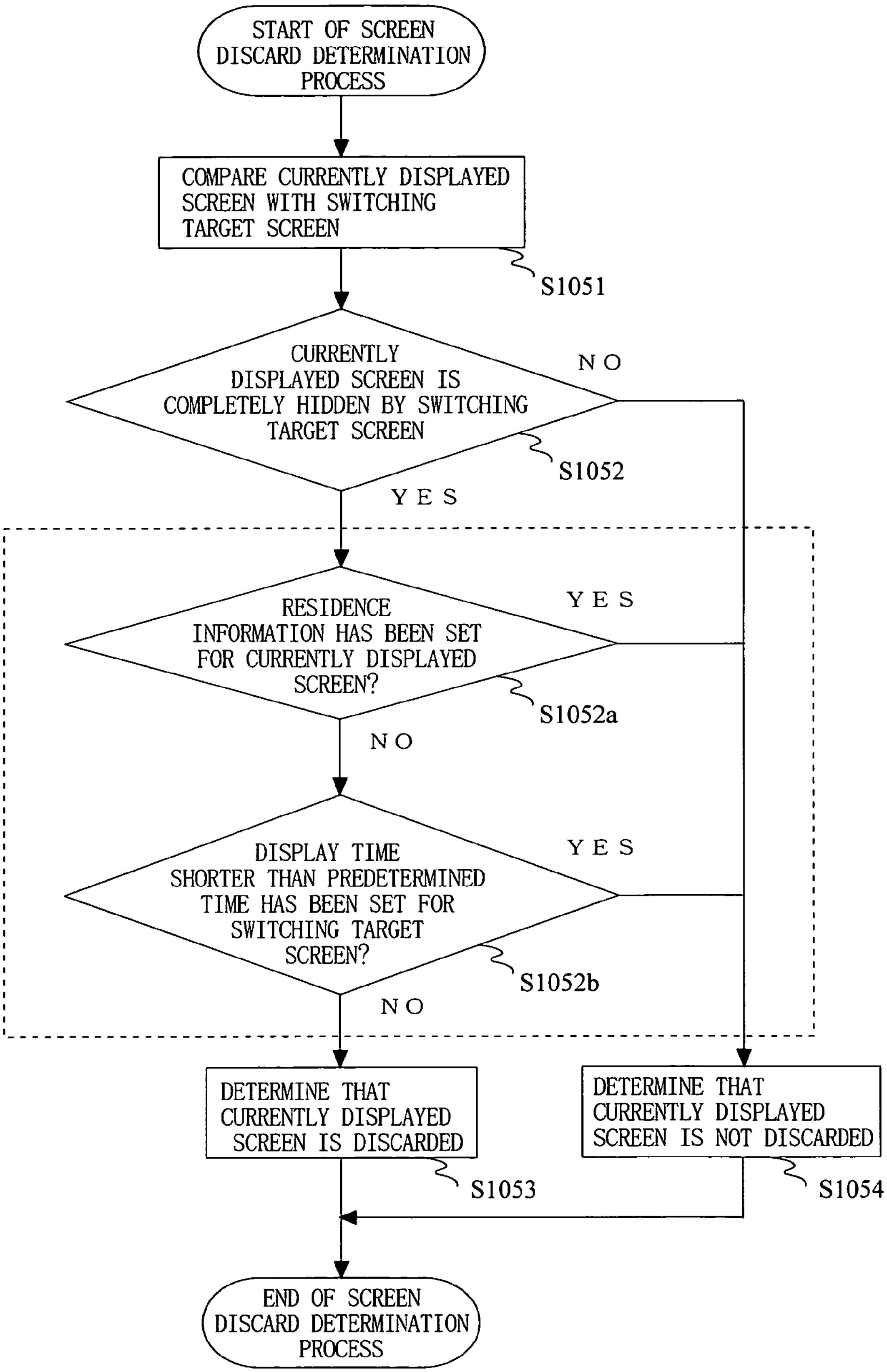
FIG. 12 is a flowchart illustrating an exemplary operation of a screen discard determination process.

Next, details of the screen discard determination process will be described with reference to FIGS. 5 to 12. FIGS. 5 to 9 are diagrams for specifically describing determination of whether or not a screen is to be discarded. FIG. 10 is a diagram illustrating exemplary screen information including residence information as a screen attribute. FIG. 11 is a diagram illustrating exemplary screen information including a display time as a screen attribute. FIG. 12 is a flowchart illustrating an exemplary operation of the screen discard determination process.

FIGS. 5 to 9 indicate a currently displayed screen 1*a*, a switching target screen 1*b*, and a resultant screen 1*c* in which the switching target screen 1*b* is overlaid on the currently displayed screen 1*a*. Although, in FIGS. 5 to 9, for the sake of simplicity, only one currently displayed screen 1*a* and only one switching target screen 1*b* are indicated, there may be a plurality of currently displayed screens 1*a*. In such a case, the screen discard determination section 105 repeatedly compares a currently displayed screen 1*a* with a switching target screen 1*b* a plurality of times. In FIGS. 5 to 9, dashed line frames in the currently displayed screen 1*a* and the switching target screen 1*b*, and a thick line frame in the resultant screen 1*c* are assumed to indicate display areas on a display. The upper left corners of the above-described dashed line frame and thick line frame are assumed to be positions having an X coordinate of 0 and a Y coordinate of 0.

Figure 5:
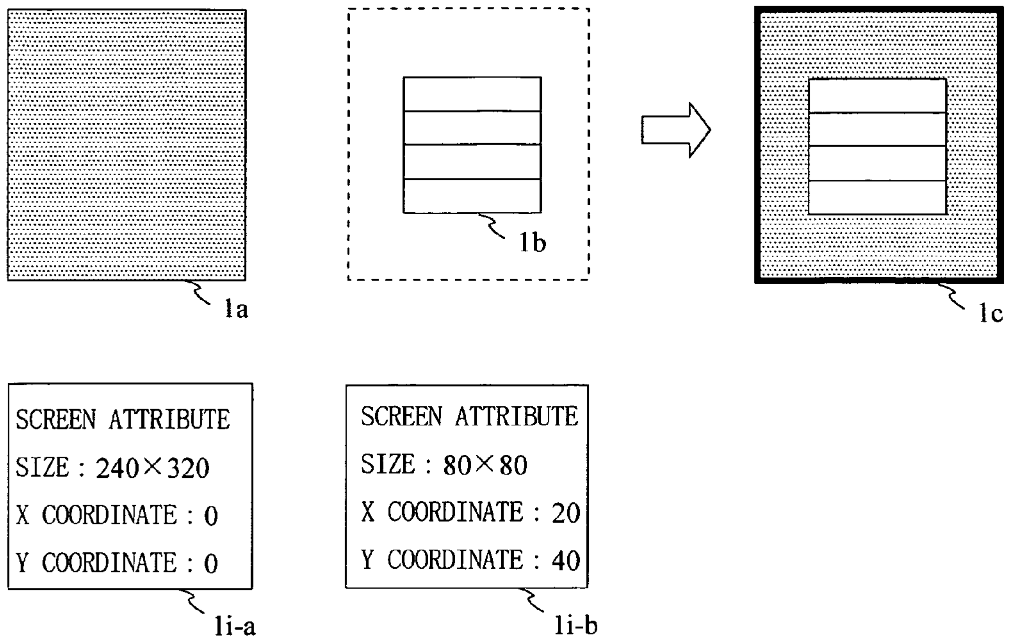
FIG. 5 is a diagram for specifically explaining determination of whether or not a screen is to be discarded.

In the example of FIG. 5, the currently displayed screen 1*a* has information about screen attributes 1*i*-*a*. The switching target screen 1*b* has information about screen attributes 1*i*-*b*. When the currently displayed screen 1*a* is transitioned to the switching target screen 1*b*, the resultant screen 1*c* is displayed on a display. In this example, the currently displayed screen 1*a* has a size larger than that of the switching target screen 1*b*, and therefore, the currently displayed screen 1*a* has a portion which does not overlap the switching target screen 1*b*. Specifically, as illustrated in the resultant screen 1*c*, the currently displayed screen 1*a* needs to be left after transition, and the screen discard determination section 105 determines that the currently displayed screen 1*a* is not to be discarded (i.e., NO at step S106).

Figure 6:
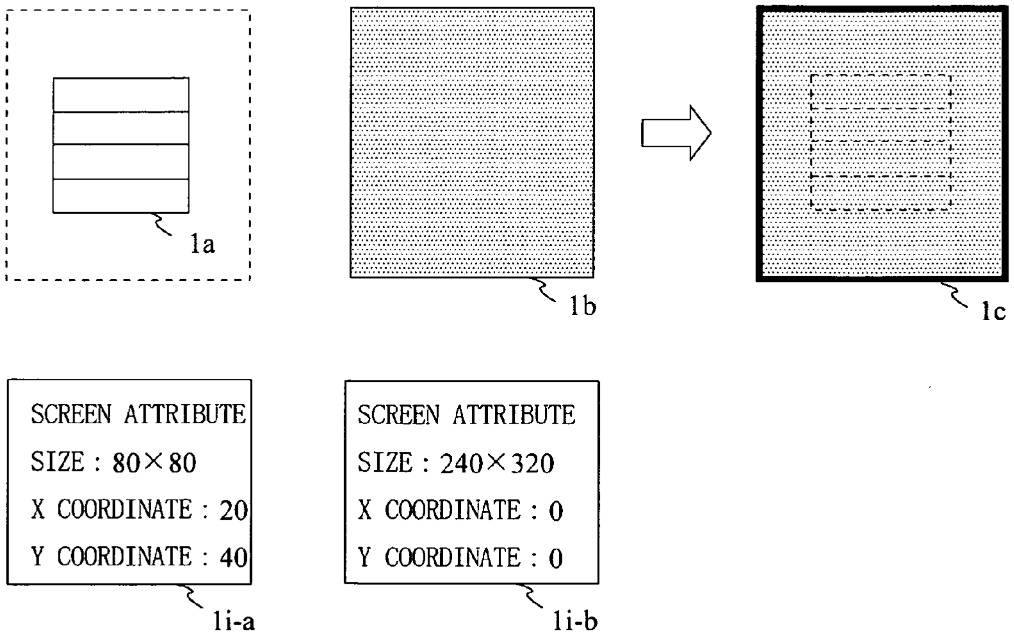
FIG. 6 is a diagram for specifically explaining determination of whether or not a screen is to be discarded.

In the example of FIG. 6, when the currently displayed screen 1*a* is transitioned to the switching target screen 1*b*, the resultant screen 1*c* is displayed on a display. In this example, since the currently displayed screen 1*a* has a size smaller than that of the switching target screen 1*b*, the currently displayed screen 1*a* is completely covered with the switching target screen 1*b*. Specifically, as illustrated in the resultant screen 1*c*, since the currently displayed screen 1*a* is no longer required, the screen discard determination section 105 determines that the currently displayed screen 1*a* is discarded (i.e., YES at step S106). Thereby, the screen control section 103 performs the screen discarding process with respect to the currently displayed screen 1*a* to release the screen resource, thereby making it possible to reduce consumed memory.

Figure 7:
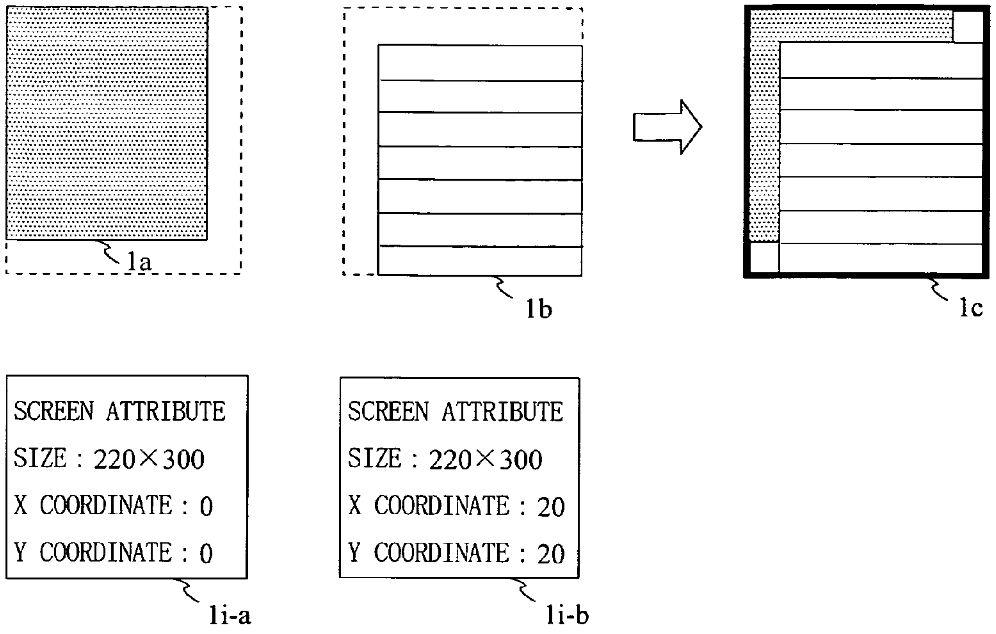
FIG. 7 is another diagram for specifically explaining determination of whether or not a screen is to be discarded.

In the example of FIG. 7, when the currently displayed screen 1*a* is transitioned to the switching target screen 1*b*, the resultant screen 1*c* is displayed on a display. In this example, the currently displayed screen 1*a* and the switching target screen 1*b* have the same size, but different display positions, so that the currently displayed screen 1*a* has a portion which does not overlap the switching target screen 1*b*. Specifically, as illustrated in the resultant screen 1*c*, the currently displayed screen 1*a* needs to be left, so that the screen discard determination section 105 determines that the currently displayed screen 1*a* is not to be discarded (i.e., NO at step S106).

Figure 8:
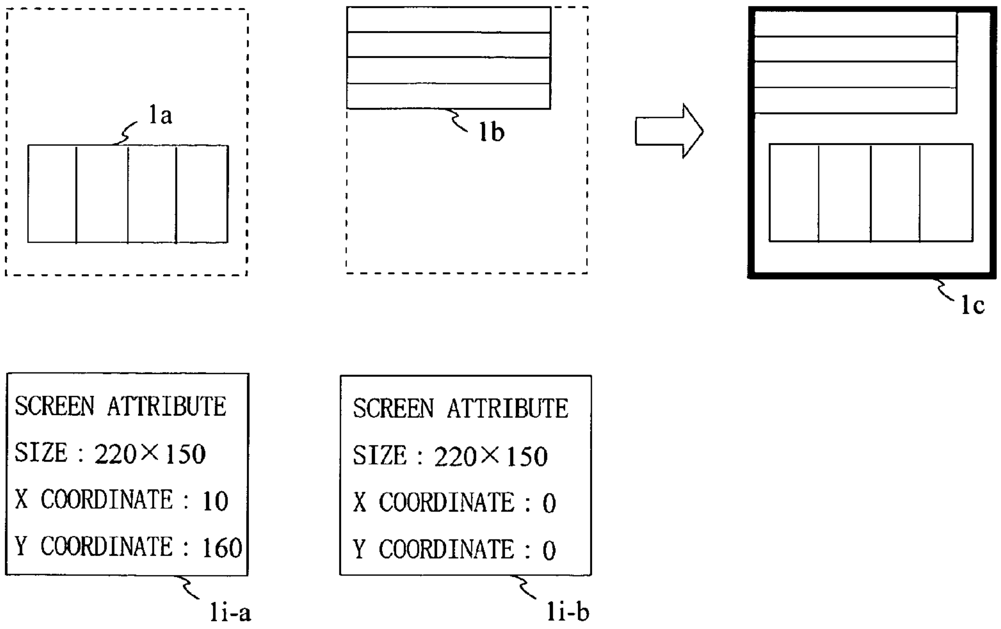
FIG. 8 is another diagram for specifically explaining determination of whether or not a screen is to be discarded.

In the example of FIG. 8, when the currently displayed screen 1*a* is transitioned to the switching target screen 1*b*, the resultant screen 1*c* is displayed on a display. In this example, the currently displayed screen 1*a* and the switching target screen 1*b* have separate display positions, so that the currently displayed screen 1*b* does not overlap the switching target screen 1*b*. Specifically, as illustrated in the resultant screen 1*c*, the currently displayed screen 1*a* needs to be left, so that the screen discard determination section 105 determines that the currently displayed screen 1*a* is not to be discarded (i.e., NO at step S106).

Figure 9:
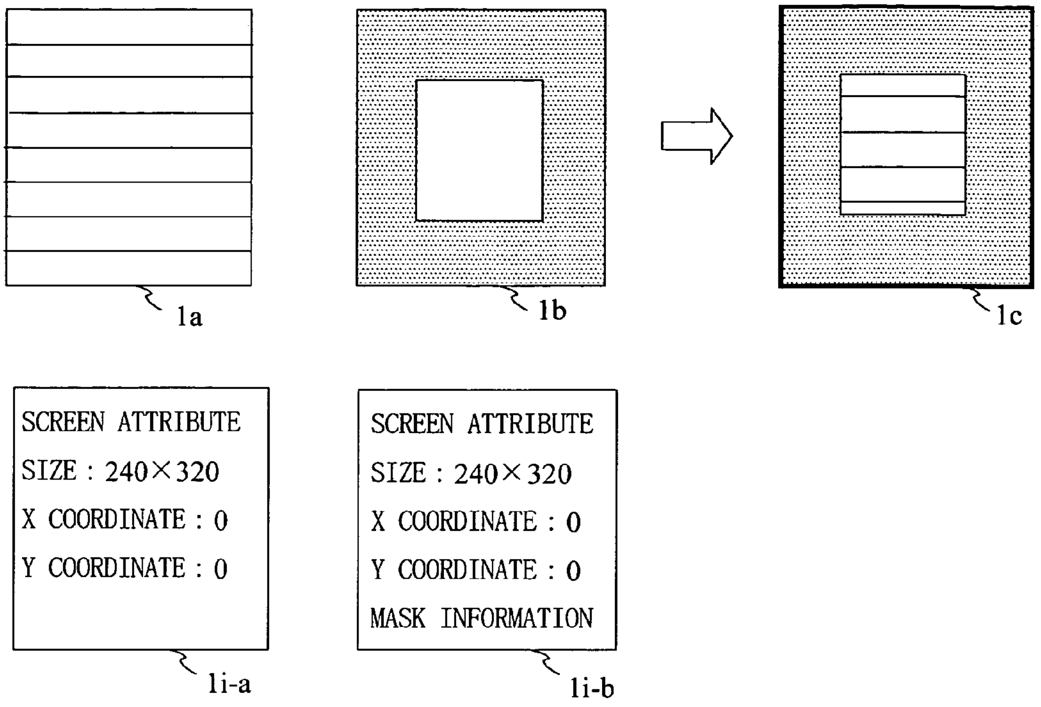
FIG. 9 is another diagram for specifically explaining determination of whether or not a screen is to be discarded.

In the example of FIG. 9, mask information is added to the screen attributes of the switching target screen 1*b*. The term "mask information" refers to information indicating that a portion of a screen is caused to be transparent. The screen discard determination section 105 needs to determine whether or not the currently displayed screen 1*a* is covered with the switching target screen 1*b*, taking into consideration the portion which is caused to be transparent based on the mask information. When the currently displayed screen 1*a* is transitioned to the switching target screen 1*b*, the resultant screen 1*c* is displayed on a display. In this example, a portion of the currently displayed screen 1*a* is still displayed through a masked portion of the switching target screen 1*b*. Specifically, as illustrated in the resultant screen 1*c*, the currently displayed screen 1*a* needs to be left, so that the screen discard determination section 105 determines that the currently displayed screen 1*a* is not to be discarded (i.e., NO at step S106).

Note that the display screen management unit 10 may add, to the screen attributes, information for determining whether a screen is resident or non-resident (hereinafter referred to as residence information) (see FIG. 10). The term "resident" refers to a state that a screen resource is invariably in the generated state. If a screen is resident, the display screen management unit 10 does not perform the screen discarding process even when the screen has been determined to be discarded. In addition, if a screen which has a high frequency of display is set to be resident, the display screen management unit 10 does not need to regenerate a resident screen which is once generated, thereby making it possible to improve screen display speed.

In addition, the display screen management unit 10 may add, to the screen attributes, information indicating a screen display time (see FIG. 11). The term "screen display time" refers to a time from when a switching target screen is displayed to when a switching target screen goes to a non-displayed state. When the display time is short, a switching target screen is quickly discarded. In such a case, it is not efficient that the display screen management unit 10 discards a currently displayed screen and performs the screen generating process again. Therefore, when a display time shorter than a predetermined time is set for a switching target screen, the screen discard determination section 105 determines that a currently displayed screen is not to be discarded even if the currently displayed screen has been determined to be discarded. When the display time of a switching target screen is short, the display screen management unit 10 does not perform the screen discarding process, thereby making it possible to improve the screen display speed.

Referring to FIG. 12, the screen discard determination section 105 compares currently displayed screen attributes with switching target screen attributes (step S1051). The screen discard determination section 105 determines whether or not a currently displayed screen is completely covered with a switching target screen, based on the sizes and the coordinate positions included in the screen attributes or the mask information (step S1052). When the currently displayed screen is completely covered with the switching target screen, the screen discard determination section 105 determines that the currently displayed screen is to be discarded (step S1053). On the other hand, when the whole or a part of the currently displayed screen is displayed simultaneously with the switching target screen, the screen discard determination section 105 determines that the currently displayed screen is not to be discarded (step S1054).

Note that, after step S1052, the screen discard determination section 105 may determine whether or not residence information is set for the currently displayed screen (step S1052*a*), or may determine whether or not a display time shorter than a predetermined time is set for the switching target screen (step S1052*b*). When residence information is set for the currently displayed screen and/or a display time shorter than a predetermined time is set for the switching target screen, the screen discard determination section 105 determines that the currently displayed screen is not to be discarded.

As described above, when a screen is transitioned, the display screen management unit 10 of the first embodiment compares the screen attributes of a currently displayed screen with the screen attributes of a switching target screen, and only when the currently displayed screen is completely covered with the switching target screen, discards a screen resource for the currently displayed screen. Thereby, the display screen management unit 10 can reduce a screen resource required to switch screens and simultaneously display a pre-transition screen and a post-transition screen.

Second Embodiment

Figures 13, 14:
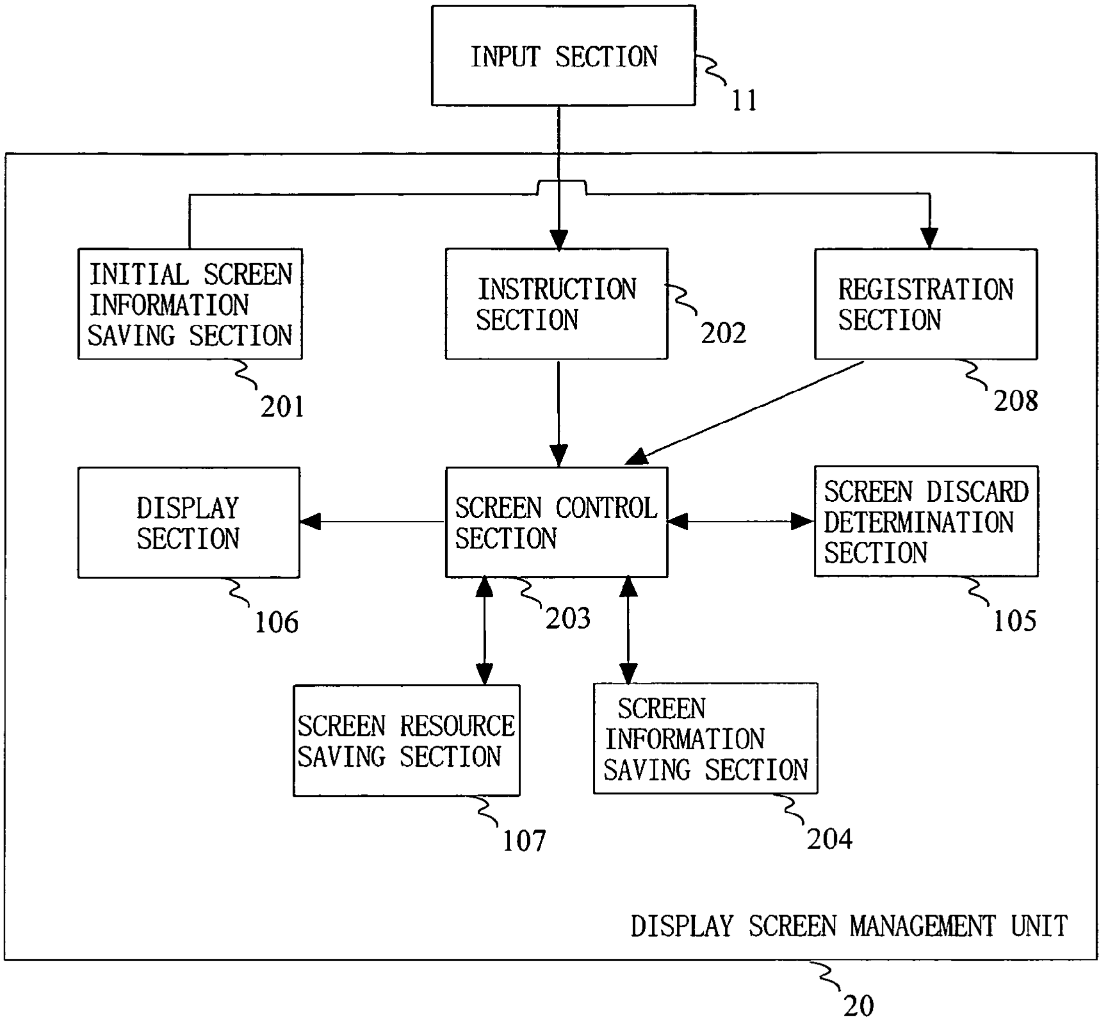
FIG. 13 is a block diagram illustrating an exemplary configuration of a display screen management unit according to a second embodiment of the present invention.
FIG. 14 is a diagram illustrating exemplary initial screen information which is saved in an initial screen information saving section.

FIG. 13 is a block diagram illustrating an exemplary configuration of a display screen management unit 20 according to a second embodiment of the present invention. When started up, or the like, the display screen management unit 20 of the second embodiment previously reads out all initial screen information from an initial screen information saving section 201, and registers all the initial screen information into a screen information saving section 204. Thereby, when a screen switching request is issued, the display screen management unit 20 does not need to save switching target screen information into the screen information saving section 204, thereby making it possible to improve the screen display speed.

In FIG. 13, the display screen management unit 20 comprises the initial screen information saving section 201, an instruction section 202, a screen control section 203, the screen information saving section 204, a screen discard determination section 105, a display section 106, a screen resource saving section 107, and a registration section 208. In the second embodiment, the same components as those of the first embodiment are referenced with the same reference numerals and will not be described.

The initial screen information saving section 201 is an area for saving initial screen information as in the first embodiment. FIG. 14 is a diagram illustrating exemplary initial screen information which is saved in the initial screen information saving section 201. Referring to FIG. 14, a screen identifier for identifying each screen is assumed to be further added to the initial screen information saved in the initial screen information saving section 201.

When receiving a request for screen switching from the input section 11, the instruction section 202 instructs the screen control section 203 to switch screens as in the first embodiment. Note that the instruction section 202 does not notify the screen control section 203 of the initial screen information stored in the initial screen information saving section 201.

Although initial screen information which is notified of by the instruction section 102 is saved into the screen information saving section 104 in the first embodiment, the screen control section 203 saves initial screen information which is notified of by the registration section 208 into the screen information saving section 204 in the second embodiment.

The screen information saving section 204 is an area for saving all screen information. The screen information saving section 204 saves screen information about a screen for which a registration request is issued by the registration section 208. FIG. 15 is a diagram illustrating exemplary screen information saved in the screen information saving section 204. Referring to FIG. 15, a screen identifier and a screen status are added to the screen information saved in the screen information saving section 204. The screen status includes "currently displayed", "not currently displayed", and "not yet generated".

The term"currently displayed" with respect to the screen status refers to a state that a screen resource is saved in the screen resource saving section 107 and a screen is currently displayed. The term "not currently displayed" with respect to the screen status refers to a state that a screen is not currently displayed, though a screen resource is saved in the screen resource saving section 107. The "not currently displayed" screen status is used to indicate a resident screen or the like. The term "not yet generated" with respect to the screen status refers to a state that a screen resource is not saved in the screen resource saving section 107, and a screen is not currently displayed on a display. When there are a plurality of currently displayed screens, the order of display can be added to the screen status. In FIG. 15, a number indicated next to the screen status "currently displayed" indicates an ordinal level of display. The display section 106 displays screens in sequence based on the order of display.

When the display screen management unit 20 is started up, a system is initialized, a predetermined application is started, or the like, the registration section 208 reads out all initial screen information saved in the initial screen information saving section 201 and notifies the screen control section 203 of the read screen information.

Figure 16:
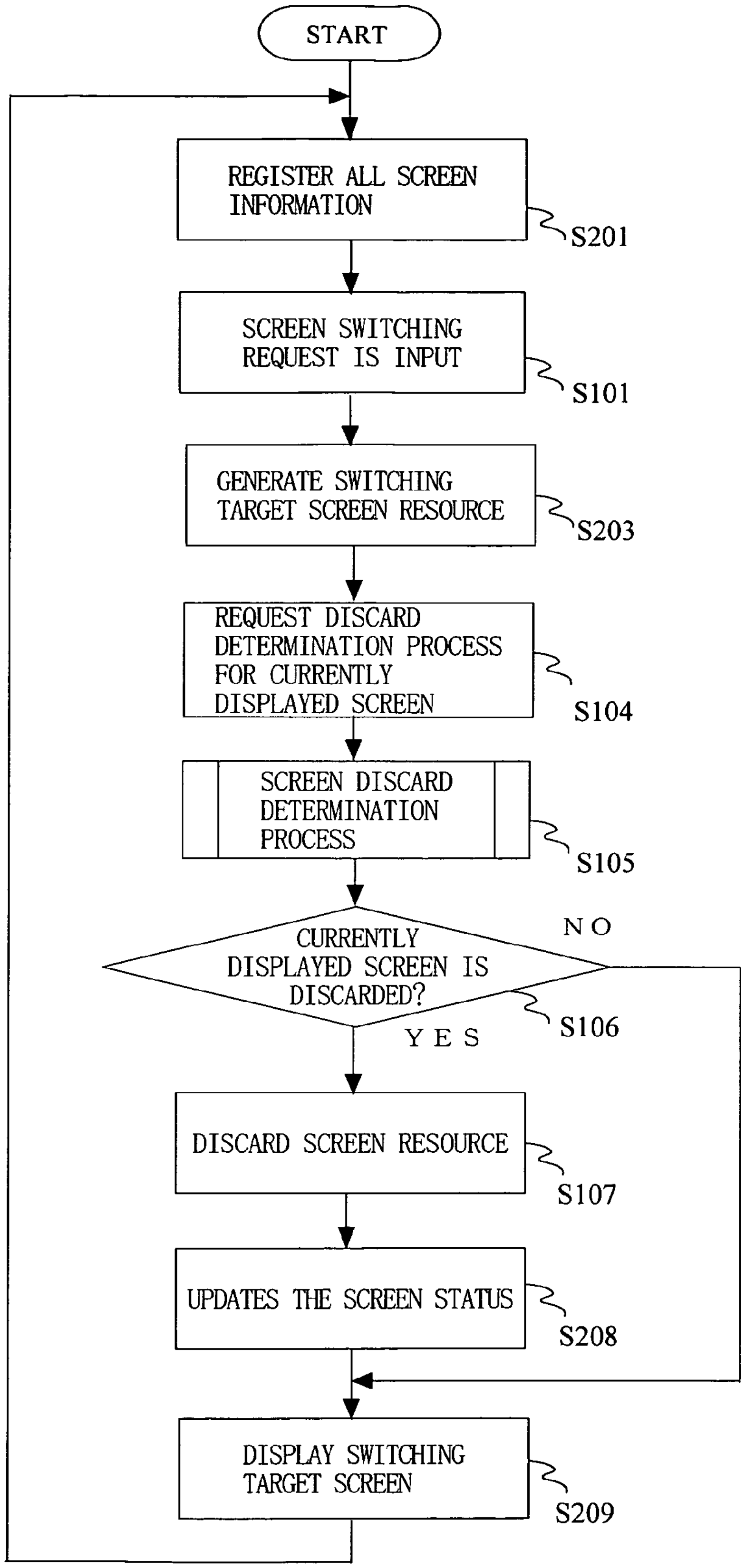
FIG. 16 is a flowchart illustrating an exemplary operation of the display screen management unit of the second embodiment of the present invention.

FIG. 16 is a flowchart illustrating an exemplary operation of the display screen management unit 20 of the second embodiment of the present invention. Note that, in FIG. 16, the same operations as that of the first embodiment are referenced by the same reference numerals and will not be described.

Referring to FIG. 16, when the display screen management unit 20 is started up or the like, the registration section 208 reads out all initial screen information from the initial screen information saving section 201, and notifies the screen control section 203 of all the initial screen information. The screen control section 203 registers all the notified screen information into the screen information saving section 204 (step S201). In this case, the screen control section 203 sets the screen status (see FIG. 15) of the screen information to be "not yet generated".

The instruction section 202 receives a screen switching request from the input section 11 as in the first embodiment (step S101). When receiving the screen switching request, the instruction section 202 notifies the screen control section 203 of a screen switching instruction. The screen control section 203 determines whether or not the screen status of a switching target screen saved in the screen information saving section 204 has been set to be "not yet generated", and only when the screen status is "not yet generated", executes the screen generating process to generate a switching target screen resource (step S203).

Operations of steps S104 to S107 are similar to those of the first embodiment and will not be described. When it is determined that a currently displayed screen is discarded, the screen control section 203 executes the screen discarding process with respect to the screen which has been determined to be discarded. Specifically, the screen control section 203 does not discard the screen information saved in the screen information saving section 204, and updates the screen status into "not yet generated" (step S208). Note that, when a screen determined to be discarded is a resident screen, the screen control section 203 sets the screen status of the screen determined to be discarded to be "not currently displayed", and does not discard the screen resource from the screen resource saving section 107.

Next, the screen control section 203 uses a screen resource saved in the screen resource saving section 107 to cause the display section 106 to display a switching target screen (step S209). In this case, the screen control section 203 sets the screen status of the screen displayed on the display section 106 to be "currently displayed". When there are a plurality of generated screen resources, the screen control section 203 notifies the screen information saving section 204 of the saved order of display of screens.

As described above, the display screen management unit 20 of the second embodiment previously saves screen information about all screens into the screen information saving section 204, thereby making it possible to reduce overhead for saving the screen information into the screen information saving section 204 when a screen switching request is issued. In addition, the screen status can be set to be "not currently displayed", so that the screen resource for a resident screen can continue to be saved. Thereby, the display screen management unit 20 can improve the screen display speed when screens are switched.

Third Embodiment

Figure 17:
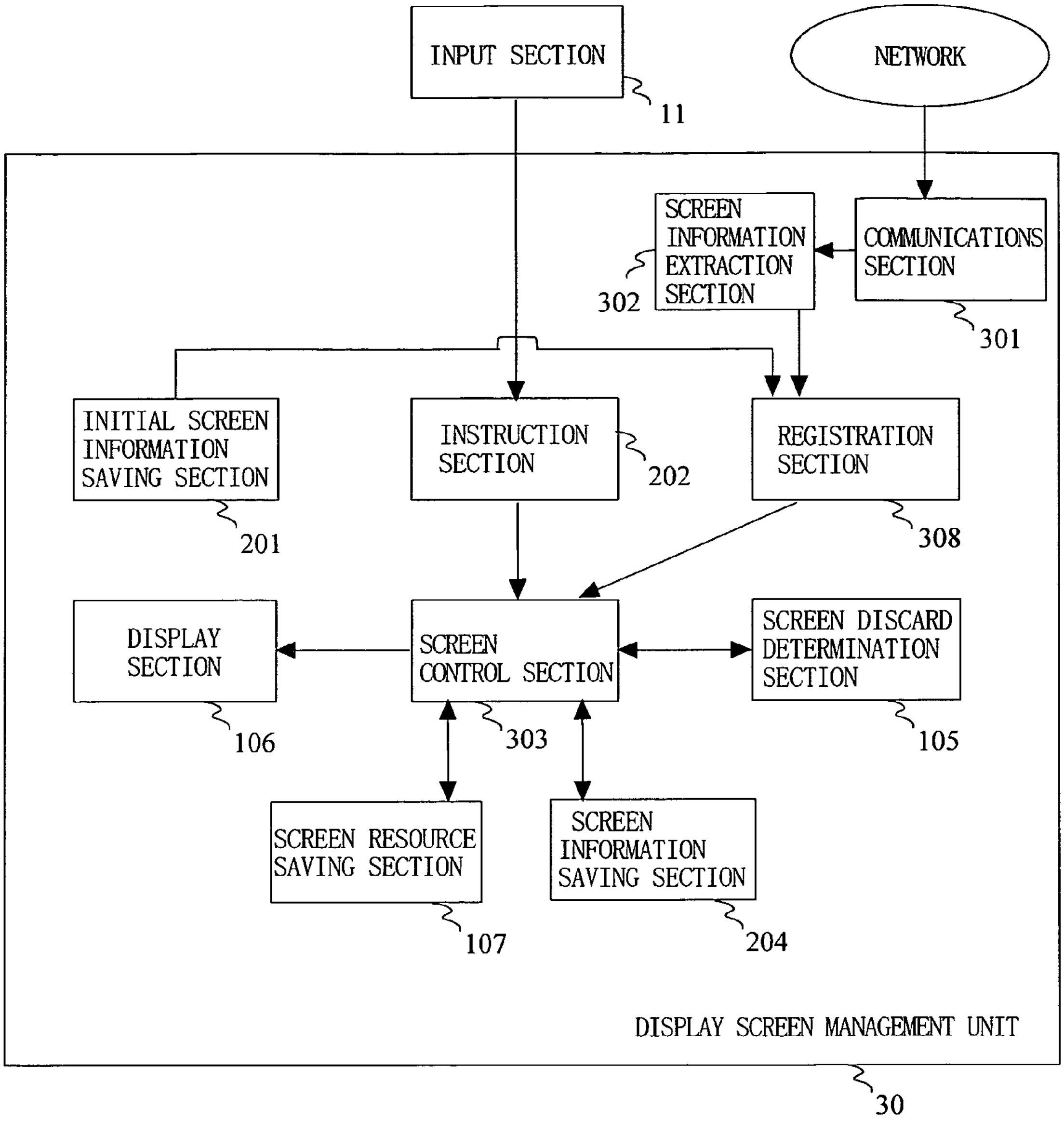
FIG. 17 is a block diagram illustrating an exemplary configuration of a display screen management unit according to a third embodiment of the present invention.

FIG. 17 is a block diagram illustrating an exemplary configuration of a display screen management unit 30 according to a third embodiment of the present invention. The display screen management unit 30 of the third embodiment can register screen information received via a network as new screen information. In FIG. 17, the display screen management unit 30 further comprises a communications section 301 and a screen information extraction section 302 as compared to the second embodiment. The communications section 301 is connected to the network in a wired or wireless manner. In the third embodiment, the same components as those of the second embodiment are referenced with the same reference numerals and will not be described.

Figures 18, 19:
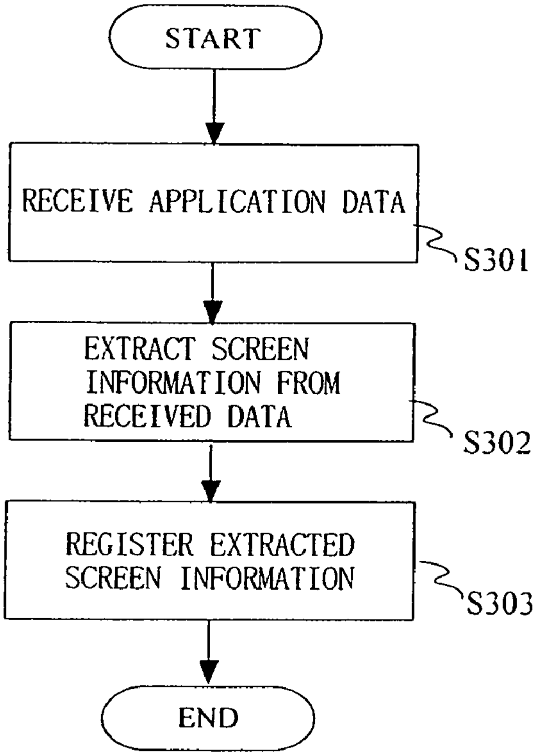
F I G. 19 PRIOR ART
FIG. 18 is a flowchart illustrating an exemplary operation until the display screen management unit registers new screen information.
FIG. 19 is a diagram illustrating an exemplary screen flow diagram used in a conventional display screen management unit.

FIG. 18 is a flowchart illustrating an exemplary operation until the display screen management unit 30 registers new screen information. Referring to FIG. 18, the communications section 301 receives application data including screen information via the network (step S301). The screen information extraction section 302 extracts the screen information from the data received by the communications section 301 (step S302). A screen control section 303 is notified of the screen information extracted by the screen information extraction section 302 via a registration section 308. The screen control section 303 registers the screen information extracted by the screen information extraction section 302 into the screen information saving section 204 (step S303).

As described above, the display screen management unit 30 of the third embodiment further comprises the communications section 301 and the screen information extraction section 302, thereby making it possible to register screen information included in application data received via a network into the screen information saving section 204. Thereby, the display screen management unit 30 can also use a screen other than those previously saved in the initial screen information saving section 201, as a switching target screen.

Note that the process procedures performed by the display screen management units described in the first to third embodiments may be implemented by predetermined program data being interpreted and executed by a CPU, where the program data is stored in a storage device (a ROM, a RAM, a hard disk, etc.) and can execute the process procedures. In this case, the program data may be introduced via a storage medium to the storage device, or may be executed directly from the storage medium. Note that the storage medium refers to a semiconductor memory (a ROM, a RAM, a flash memory, etc.), a magnetic disk memory (a flexible disk, a hard disk, etc.), an optical disc memory (a CD-ROM, a DVD, a BD, etc.), a memory card, or the like. The storage medium has a concept including communications media, such as a telephone line, a transfer path, and the like.

INDUSTRIAL APPLICABILITY

The display screen management unit of the present invention is suitable for reduction of a screen resource required to switch screens, or the like, and is useful particularly for apparatuses and systems having low hardware performance, such as a mobile telephone, a PDA, and the like.

The invention claimed is:

1. A display screen management apparatus for controlling a screen resource that is required to display a screen on a display, the display screen management apparatus comprising:

a screen information saving section including a memory for saving attribute information of the screen, the attribute information including a size of the screen and residence information indicating whether the screen is in a resident state or a non-resident state;

a screen resource saving section for saving the screen resource;

a screen control section for generating, using the attribute information of the screen saved in the screen information saving section, a screen resource to be used for generating a screen to be displayed on the display, and for saving the generated screen resource in the screen resource saving section;

an instruction section receiving an instruction to switch a screen currently displayed on the display to another screen; and a screen discard determination section for determining whether or not to discard the screen resource of the currently displayed screen when the currently displayed screen is switched to the another screen, wherein, when the instruction section receives the instruction to switch the screen currently displayed on the display to the another screen, the screen control section saves, in the screen information saving section, attribute information corresponding to the another screen and saves, in the screen resource saving section, a screen resource of the another screen generated using the attribute information corresponding to the another screen, wherein, when the screen discard determination section determines, based on attribute information of the currently displayed screen and the attribute information corresponding to the another screen, that (i) the currently displayed screen is completely hidden by the another screen, and (ii) the attribute information of the currently displayed screen indicates that the currently displayed screen is in the resident state indicating that the screen resource of the currently displayed screen is to invariably remain in a generated state, the screen control section displays, using the screen resource of the another screen, the another screen on the display without discarding the screen resource of the currently displayed screen from the screen resource saving section, and wherein, when the screen discard determination section determines, based on the attribute information of the currently displayed screen and the attribute information corresponding to the another screen, that (iii) the currently displayed screen is completely hidden by the another screen, and (iv) the attribute information of the currently displayed screen indicates that the currently displayed screen is in the non-resident state, the screen control section displays, using the screen resource of the another screen, the another screen on the display and discards the screen resource of the currently displayed screen from the screen resource saving section.

2. The display screen management apparatus according to claim 1, wherein, when the attribute of the currently displayed screen does not indicate that the currently displayed screen is in the resident state, and when a display time, from when the another screen is displayed on the display to when the another screen is in a non-displayed state, is shorter than a predetermined time, the screen discard determination section determines not to discard the screen resource of the currently displayed screen.

3. The display screen management apparatus according to claim 1, wherein, when it is determined that the currently displayed screen is completely hidden by the another screen and when it is determined that by causing at least a portion of the another screen to be transparent, the currently displayed screen is not hidden by the another screen, the screen discard determination section determines to display the another screen on the display without discarding the screen resource of the currently displayed screen.

4. A method performed by a display screen management apparatus for controlling a screen resource that is required to display a screen on a display, the display screen management apparatus including a screen information saving section for saving attribute information of the screen, the attribute information including a size of the screen and residence information indicating whether the screen is in a resident state or a non-resident state, and the display screen management apparatus including a screen resource saving section for saving the screen resource, the method comprising:

a screen control step of generating, using the attribute information of the screen saved in the screen information saving section, a screen resource to be used for generating a screen to be displayed on the display, and for saving the generated screen resource in the screen resource saving section;

an instruction step of inputting an instruction to switch a screen currently displayed on the display to another screen; and a screen discard determination step of determining whether or not to discard the screen resource of the currently displayed screen when the currently displayed screen is switched to the another screen, wherein, when the instruction step inputs the instruction to switch the screen currently displayed on the display to the another screen, the screen control step saves, in the screen information saving section, attribute information corresponding to the another screen and saves, in the screen resource saving section, a screen resource of the another screen generated using the attribute information corresponding to the another screen, wherein, when the screen discard determination step determines, based on attribute information of the currently displayed screen and the attribute information corresponding to the another screen, that (i) the currently displayed screen is completely hidden by the another screen, and (ii) the attribute information of the currently displayed screen indicates that the currently displayed screen is in the resident state indicating that the screen resource of the currently displayed screen is to invariably remain in a generated state, the screen control step displays, using the screen resource of the another screen, the another screen on the display without discarding the screen resource of the currently displayed screen from the screen resource saving section, and wherein, when the screen discard determination step determines, based on the attribute information of the currently displayed screen and the attribute information corresponding to the another screen, that (iii) the currently displayed screen is completely hidden by the another screen, and (iv) the attribute information of the currently displayed screen indicates that the currently displayed screen is in the non-resident state, the screen control step displays, using the screen resource of the another screen, the another screen on the display, after discarding the screen resource of the currently displayed screen from the screen resource saving section.

* * * * *